United States Patent Office 3,014,917
Patented Dec. 26, 1961

3,014,917

PREPARATION OF CRYSTAL STABLE COPPER PHTHALOCYANINE

John W. Minnich, Wilmington, Del., assignor to E. I. du Pont de Nemours and Company, Wilmington, Del., a corporation of Delaware No Drawing. Filed Oct. 7, 1960, Ser. No. 61,086
2 Claims. (Cl. 260—314.5)

This invention relates to the preparation of copper phthalocyanine pigments of improved crystal stability.

Phthalocyanine pigments, and copper phthalocyanine in particular, are well-known products which are described in many patents and other publications. There are two widely used methods of preparation. In the one method, a phthalic acid derivative, such as phthalic anhydride, is reacted with urea and a metal salt, such as copper chloride, usually in the presence of an inert diluent liquid at temperatures in the range of about 190° C.–220° C. In the other method, an aromatic dinitrile, such as phthalonitrile, is reacted with a metal salt, such as a copper chloride, at a temperature in the range of 180° C.–300° C. As in the first process, it is common to carry out this reaction in the presence of an inert diluent liquid although both processes may be carried out in the absence of diluent liquid. The diluent liquid may be removed by simple filtration, by steam distillation, or by simple decantation after the pigment has been treated to promote settling. This is usually followed by a conventional drying step. After drying, pigments obtained by either of these processes are usually subjected to some form of particle size reduction to develop their full pigmentary properties.

Copper phthalocyanine produced by the phthalic anhydride urea synthesis with copper chloride is substantially free of chlorine substituents on the aromatic nuclei of the phthalocyanine residue. This compound exists in two crystal phases which differ radically in their color and in their stability in the presence of organic liquids such as aromatic hydrocarbons. The crystal phase possessing the greener shade is referred to by most persons skilled in the art as the beta crystal phase (see FIAT Report 1313, vol. 3, p. 447; also U.S. Patent 2,556,726). This beta crystal phase product is quite stable in the presence of solvents. On the other hand, a redder shade of this same compound, which is known as the alpha crystal phase, is much less stable, and it is subject to crystal growth and phase change in the presence of organic solvents.

It is therefore an object of this invention to prepare crystal-stable copper phthalocyanine pigments which exhibit the red shade and the high intensity of alpha phase copper phthalocyanine.

This object is accomplished in the known process for the production of copper phthalocyanine by reaction of phthalic anhydride with urea and a copper chloride. The improvement comprises conducting the reaction in the presence of a small amount of phenylacetonitrile sufficient to improve the crystal stability of the copper phthalocyanine product. The product thus prepared has substantially the same hue and strength of a product prepared in the absence of phenylacetonitrile. Yet it possesses the additional property of being crystal stable to aromatic solvents, such as xylene, for prolonged periods of exposure.

In describing this invention in more detail, it is pointed out that in the phthalic anhydride-urea synthesis of copper phthalocyanine, it is well known to carry out the reaction with the ingredients in suspension in a purified kerosene using four mols of phthalic anhydride suspended in approximately 8 to 9 times its weight of kerosene together with about 15 to 16 mols of urea and from about 0.9 to about 1.1 mols of a copper salt, preferably cupric chloride, and a small amount (approximately ½% of the weight of the phthalic anhydride) of ammonium molybdate as a catalyst. These reactants are commonly heated, under conditions of good agitation and with a reflux condenser to avoid loss of the solvent, to a temperature approximating 200° C. for a period of time varying from about two to four hours. After the application of suitable methods of isolation from the organic solvent, suitable methods of particle size reduction, and finally isolating the product as a dry pigment, there is commonly obtained a high-strength red shade copper phthalocyanine pigment in from 85% to 90% of the theoretical yield based on phthalic anhydride used. However, such a product is not crystal stable when exposed to organic solvents.

If, on the other hand, phenylacetonitrile in an amount of from about 2% to about 10% by weight of the phthalic anhydride is introduced into the synthesis which is then carried out in an otherwise normal manner followed by the previously known methods of isolation and particle size reduction, a product is obtained which has substantially the same strength, shows relatively small differences in color from the untreated product, but now is stable in the presence of organic solvents such as xylene for prolonged periods at 100° C. or thereabouts.

For a clearer understanding of the invention, the following specific examples are given. These examples are intended to be merely illustrative of the invention and not in limitation thereof. Unless otherwise specified, all parts are by weight.

*Example I*

Approximately 720 parts of purified kerosene is introduced into a suitable reaction vessel equipped for efficient agitation and for external heating and fitted with a condenser to prevent loss of the solvent at high temperature. There is then added to the vessel 100 parts of phthalic anhydride, 2 parts of phenylacetonitrile, 155 parts of urea, 0.5 part of ammonium molybdate, 30 parts of cupric chloride ($CuCl_2 \cdot 2H_2O$) and while stirring vigorously, the synthesis mass is heated over a period of about two hours to 220° C. and held for four hours within the temperature range of 215–220° C. The mixture is then cooled while stirring is continued to a temperature below 100° C. and added to about 2000 parts of water containing about 20 parts of sodium hydroxide, boiled two hours, filtered hot, washed alkali free, and dried at 150° C. under vacuum until substantially free of kerosene. There is obtained 104.5 parts of crude pigment from which 80.6 parts of a relatively pure copper phthalocyanine pigment may be obtained by extraction at the boil in a dilute acid solution. This product corresponds to a yield of 86.7% of theory based on the phthalic anhydride used. A sample extracted in dilute acid analyzes 10.63% organic copper and 0.82% organic chlorine which is typical of unsubstituted copper phthalocyanine prepared by this method.

Particle size reduction of this product is carried out by a two-step process. The first step comprises milling a portion of the product in a ball mill containing relatively large grinding aids, such as "Cylpebs" (steel rods about 1" by ½"), for about six hours. In the second step, after discharge from the mill, ten parts of this dry-milled copper phthalocyanine is dusted into about 50 parts of 70% sulfuric acid with stirring until all of the powder is wet. The mixture is then allowed to stand for one hour, diluted with about 300 parts of water, and boiled for one hour. The pigment is isolated by filtration, washing free of soluble salts, and drying to give about 10 parts of an alpha phase red shade copper phthalocyanine which is substantially equivalent to an untreated control in color and is completely stable both with respect to crystal growth and to phase change for more than four hours in xylene at 100° C.

*Example II*

The process described in Example I above is carried out in exactly the same manner except that five parts of phenylacetonitrile is used in place of the two parts shown in Example I. The resulting product is obtained in a similar yield and has substantially the same properties throughout except for a tendency to some dullness in blue.

*Example III*

700 parts of purified kerosene is introduced into the reaction vessel described in Example I followed by the addition of 155 parts of urea, 0.5 part of ammonium molybdate, 100 parts of phthalic anhydride, 10 parts of phenylacetonitrile, and 30 parts of cupric chloride ($CuCl_2 \cdot 2H_2O$). While stirring vigorously, the charge is heated over a period of about two hours to about 195° C. and held within 5° of this temperature for about four hours. After the mixture has been cooled to about 100° C., while stirring is continued, there is added about 325 parts of concentrated $H_2SO_4$. After stirring for a brief period, the agitator is stopped and the kerosene is decanted from the solid which settles rapidly to the bottom of the vessel. The charge is then added to about 5000 parts of a mixture of ice and water, stirred vigorously for a short time to complete the hydrolysis of the phthalocyanine sulfate, and then heated rapidly to a temperature of about 90° C., stirred for a short time at this temperature, and filtered hot. The filter cake is washed acid free and then washed on the funnel with a dilute solution of an ammonium hydroxide and finally dried at 150° C. under vacuum until substantially free of kerosene. Approximately 80 parts of a relatively pure copper phthalocyanine pigment is obtained. It is found to exhibit the alpha crystal phase when examined by X-ray diffraction and is stable both to any change of crystal phase and to any evidence of crystal growth when slurried in xylene and held at a temperature of about 100° C. for about one hour.

This product may be converted to a small particle size by any of the convenient methods heretofore known without influencing its stability to change in organic solvents. Thus, the method shown in detail in Example I may be used or the product may be completely dissolved in sulfuric acid and precipitated by dilution in water. It may also be ground to a small particle size by milling in acetone or by dry milling in the presence of several parts of any inorganic salt such as sodium chloride. These are all methods well known in the art and exert no significant influence on the properties of this pigment other than to reduce the particle size and thus to make more readily available the inherent color values in the pigment.

*Example IV*

About 6600 parts of a purified kerosene is added to a suitable closed vessel blanketed with an inert gas such as carbon dioxide and there are then added, in order, 2100 parts of urea, 410 parts of cupric chloride dihydrate, 1360 parts of phthalic anhydride, 6.5 parts of ammonium molybdate, and 28 parts of phenylacetonitrile. The vessel is closed and heated externally to a temperature of 195° C. over a period of about two hours and held within 5° of this temperature for an additional period of 3½ hours. The charge is then flushed into a separate vessel containing 5400 parts of water after which 292 parts of sodium hydroxide (585 parts of a 50% solution) is added to the vessel giving a pH of 10.0 or above. The charge is then heated to about 85° C. and held at that temperature for about two hours, after which it is filtered and washed substantially free of any soluble salts. The product is dried at about 150° C. until substantially free of residual kerosene. The product is substantially equivalent in all respects to that of Example I and may be converted to a pigmentary particle size by the method shown in Example I or by any of the methods mentioned in Example III.

*Example V*

Approximately 600 parts of trichlorobenzene is added to a suitable reaction vessel equipped for efficient agitation and for external heating and fitted with a condenser to prevent loss of the solvent at high temperature. There is then added to the vessel, 168 parts of the phthalic anhydride, 3.5 parts of phenylacetonitrile, 243 parts of urea, 0.35 part of ammonium molybdate, and 39 parts of anhydrous cupric chloride. The vessel is closed and heated, over a period of 2 hours, to raise the temperature of the reaction mass to 195° C. A reaction temperature of 190° C. to 200° C. is maintained for an additional period of 3½ hours. The charge is transferred to a steam still containing 170 parts of 30% aqueous sodium hydroxide solution, and thereafter steam distilled until it is free of trichlorobenzene. The mass is filtered, the filter cake is washed substantially free of alkali, and the cake is dried at about 150° C. The product is substantially equivalent in all respects to that of Example I, except that it is approximately 75% in the beta crystal phase, and it is converted to an alpha phase product in a pigmentary particle size by the method shown in that example.

The effect of the addition of phenylacetonitrile to the synthesis of a copper phthalocyanine prepared as shown in the examples above is not dependent upon any of the details of the synthesis other than the relative amount of phenylacetonitrile with respect to the principal ingredients used. Processes for the preparation of copper phthalocyanine by means of the reaction of phthalic anhydride with urea in the presence of copper chloride and a suitable catalyst are well known in the art, and the application of variations in the amounts of ingredients is equally known. Thus, for instance, the amount of urea could be increased manyfold without significantly influencing the course of the reaction since any excess over and above that shown will be essentially a diluent in the molten reaction mass. Likewise, an excess of copper chloride is not a critical variation, the principal effect of either excess being an increase in cost of the operation. Moreover, the reaction could be carried out without a catalyst if someone should so desire to operate in a less efficient manner.

Reaction temperatures generally used for the synthesis of copper phthalocyanine using phthalic anhydride, urea, and a copper chloride are well known. Such temperatures are usually at least about 180° C. and of course they should be below the decomposition temperature of the reactants and the product produced. Such temperatures are of course maintained until a blue coloring matter is produced.

In the examples, kerosene and trichlorobenzene have been shown as the diluent for the reaction, but it could be equally as well carried out in other high-boiling solvents such as orthodichlorobenzene. In fact, the complete omission of a solvent and the carrying out of this reaction as a molten reaction mass is entirely feasible except for the difficulty of removing the mass from the reaction vessel. Certain adaptations of the phthalocyanine synthesis for reaction in the absence of any liquid diluent have been proposed in the past and the presence of phenylacetonitrile in such reactions will be equally effective as it is in the detailed procedure shown above. Thus, it has been proposed to dilute the reactants with several parts of an inert solid such as sodium chloride and pass such a mixture through a heated tube under propulsion by a screw conveyor to obtain the solid mixture of pigment and salt discharged from this conveyor. Such a mixture requires extraction of the salt from the mixture but, in other respects, it is comparable to the crude pigment obtained in the examples shown above.

The effect of phenylacetonitrile in such a synthesis would be the same as it is in the examples shown.

The only important variable in this process, in comparison to the prior art, is the introduction of the phenylactonitrile to the phthalic anhydride-urea synthesis. Very small amounts, as little as 0.5% based on the phthalic anhydride used, show a significant influence on the crystal stability of the product. However, it appears to require 2% phenylacetonitrile on the same basis to give a product which meets the need for complete crystal stability in most uses. Still higher amounts, up to about 10%, give increased stability under all circumstances. As the amount of phenylacetonitrile approaches this point, there is evidence of some undesirable reaction products and when the amount exceeds about 10% of the weight of the phthalic anhydride, the undesirable reaction products become so significant as to offset any advantages to be obtained by the addition. Therefore, for all practical purposes the preferred amount of agent is in the range of about 2% to about 5% based on phthalic anhydride and the usable range extends from a minimum of about 0.5% to a maximum of about 10%. If the amount of phenylacetonitrile used in the synthesis is greater than about 5%, the copper phthalocyanine obtained is predominantly in the alpha crystal phase. With lesser amounts of phenylacetonitrile, the product of the synthesis may not be predominantly in the alpha crystal phase. However, when such a material is converted to the alpha crystal phase by conventional procedures for producing an alpha phase pigment product, such product exhibits the high degree of crystal stability associated with this invention.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. In a process for the production of copper pathalocyanine by reaction of phthalic anhydride with urea and a copper chloride, the improvement which comprises conducting said reaction in the presence of a small amount of phenylacetonitrile sufficient to improve the crystal stability of the copper phthalocyanine product.

2. In a process for the production of copper phthalocyanine by reaction of phthalic anhydride with urea and a copper chloride, the improvement which comprises conducting said reaction in the presence of about 2% to 10% of phenylacetonitrile based on the weight of the phthalic anhydride used.

No references cited.